March 12, 1940.   R. S. HOPKINS   2,193,027
DOCUMENT HOLDING DEVICE
Filed Sept. 22, 1937   2 Sheets-Sheet 1

Roy S. Hopkins
INVENTOR.

BY
ATTORNEY.

March 12, 1940.  R. S. HOPKINS  2,193,027
DOCUMENT HOLDING DEVICE
Filed Sept. 22, 1937  2 Sheets-Sheet 2
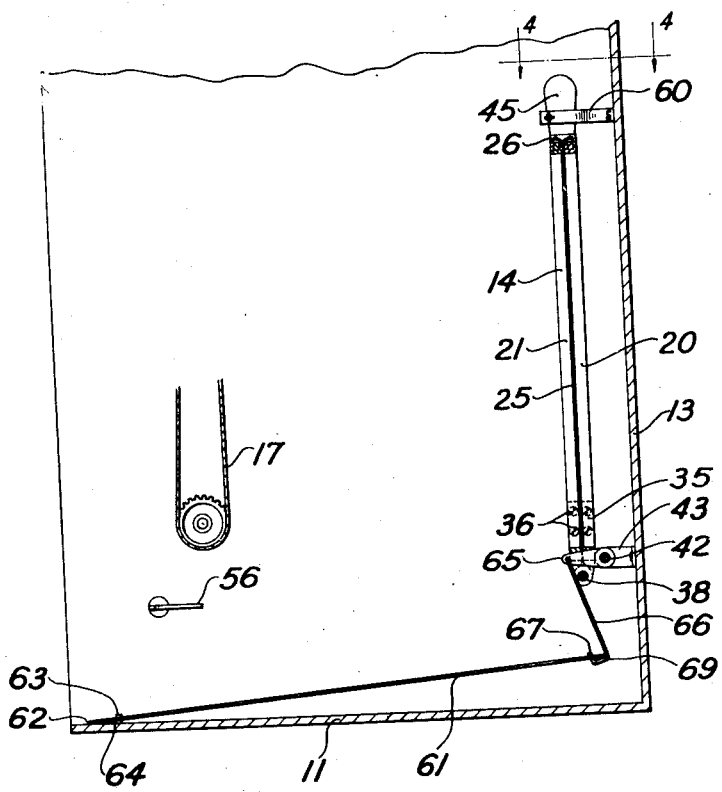
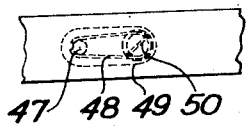
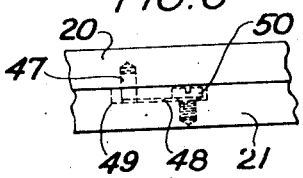
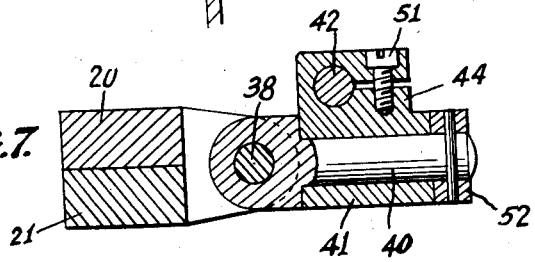
Roy S. Hopkins
INVENTOR Patented Mar. 12, 1940

2,193,027

UNITED STATES PATENT OFFICE 2,193,027

DOCUMENT HOLDING DEVICE

Roy S. Hopkins, Rochester, N. Y., assignor to Eastman Kodak Company, Rochester, N. Y., a corporation of New Jersey Application September 22, 1937, Serial No. 165,117

8 Claims. (Cl. 88—24)

The present invention relates to a machine for photographically recording documents, and more particularly to a device for holding a plurality of small documents such for example, as checks so that the latter may be photographed on miniature film. The machine is also adapted to be used as a projecting apparatus to project enlarged images of a miniature film onto a suitable viewing screen.

One object of the invention is the provision of a device for holding a plurality of small documents in position to be photographed.

Another object of the invention is the provision of an approved means for reversibly supporting such a device so that one or both sides of the documents held therein may be selectively photographed.

A further object is the provision of a document holding device which is simple in construction, relatively inexpensive to manufacture, and highly effective in use.

Still another object of the invention is the provision of a document holding device of the type described, which is readily movable to an operative position in the photographic field of a camera so that the various documents may be photographed, or movable to an inoperative position out of such field so that the apparatus may be used for projecting enlarged images of a miniature film.

A still further object is the provision of an arrangement in which a viewing screen is operatively connected to the supporting means for the document holding device, so that when the latter is moved to its operative position, the viewing screen is in an inoperative position; but, when the document holding device is moved to an inoperative position, the viewing screen is automatically moved to an operative position to receive enlarged projected images of a miniature film.

To these and other ends, the invention resides in certain improvements and combinations of parts, all as will be hereinafter more fully described, the novel features being pointed out in the claims at the end of the specification.

In the drawings:

Fig. 3 is a view similar to Fig. 2, but taken substantially on the line 3—3 of Fig. 1, showing the document holding device in its elevated or inoperative position, and the viewing screen moved to its inclined or operative position;

Fig. 4 is an enlarged fragmentary view taken on line 4—4 of Fig. 3, showing the spring clip for releasably retaining the frame members of the document holding device in its elevated or inoperative position;

Fig. 5 is an enlarged fragmentary plan view of the front portion of the frame members of the document holding device, showing the spring means for releasably holding the two frame members in closed position; and Fig. 6 is a front elevation view of the structure illustrated in Fig. 5.

Fig. 7 is a vertical sectional view taken substantially on the line 7—7 of Fig. 1, showing the arrangement for pivotally and swingably mounting the document supporting members.

Similar reference numerals throughout the various views indicate the same parts.

The present invention is embodied in the present instance, by way of illustration, in an apparatus for photographically recording a plurality of small documents such, for example, as checks. These documents are held in a device which is adapted to be positioned in the photographic field of a camera, mounted on the top of the apparatus, so that the documents may be photographically recorded on miniature film. The document holding device is pivotally mounted so that it may be flipped or turned over, so that the reverse side of the document may also be photographed, thus providing a complete photographic record. When not in use, the document holding device may be moved to an inoperative position out of the field of the camera. A viewing screen is operatively connected to the supporting means of the document holding device so that, when the latter is moved to an inoperative position, the viewing screen is automatically moved to a position to receive an enlarged image from a projector positioned in the top of the apparatus adjacent the photographic camera. The apparatus may thus be used either to photograph a plurality of checks or to view an enlarged image of a group of checks which have been previously photographed. The present invention, however, relates primarily to the device for holding the checks.

Figure 2:
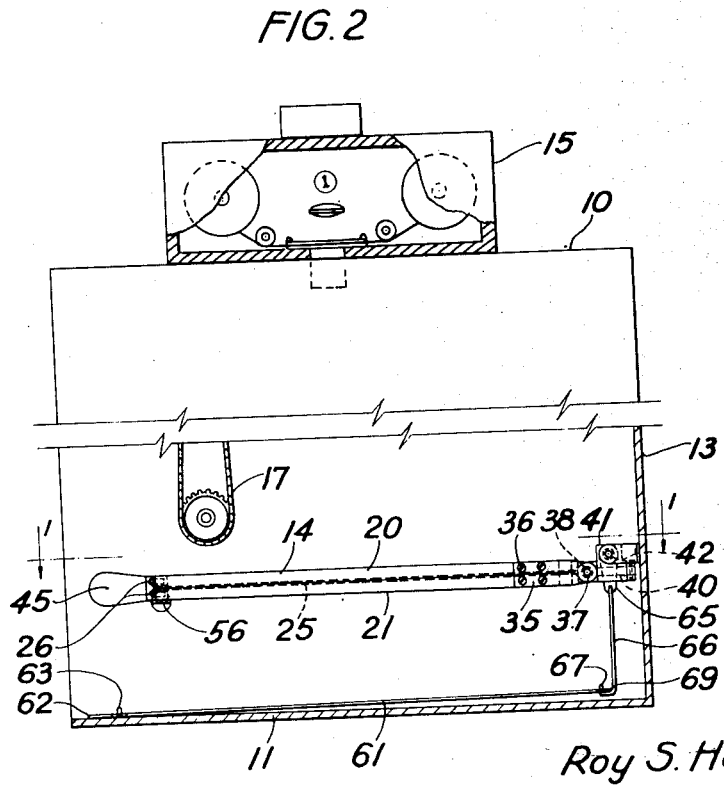
Fig. 2 is a side elevation view taken substantially on the line 2—2 of Fig. 1, showing the arrangement for pivotally supporting the document holding device.

Referring now to the drawings, and particularly to Fig. 2, there is shown a cabinet or housing formed of any suitable material, such as wood, to provide a top 10, a bottom 11, sides 12 and a back 13, all of which may be broadly considered as sides. The front of the housing is open to afford access to the document holding device, generally indicated by the numeral 14 and hereinafter more fully described. The top 10 is provided with a light-tight enclosure 15 which houses a camera and a projector, of any standard or suitable type, adapted for use with miniature film. While the camera and projector are preferably both permanently housed in the enclosure 15 so that the device may be used either as a photographic or projection apparatus, it is contemplated the camera and projector may be made removable and interchangeable, if desired. A lever 16 is pivotally mounted on one of the sides 12 and is arranged to move the miniature film strip through the gate of the camera and to also operate the shutter thereof, in a manner well known to those in the art. A chain drive 17, operated by a hand crank, not shown, is provided for manually moving the miniature film strip through the projector. The above-described apparatus, with exception of the document holding device, may be of any suitable and/or well known construction and does not constitute a part of the present invention.

In order to photograph a plurality of small documents such, for example, as checks, the present invention provides a document holding device 14 in which the checks may be supported and maintained in flat position during the photographing operation. This document holding device comprises, in general, a pair of open rectangular frame members 20 and 21, each of which is formed of substantially rigid material, preferably metal, to provide a front 22, sides 23, and a back 24, all of which may be broadly considered as sides of the frame member. These frame members provide a support for a plurality of spaced tightly-strung wires or filaments 25, on which the documents are positioned as later described. These wires are of such size as not to appreciably obstruct any written or printed matter on the various documents positioned thereon.

Figure 1:
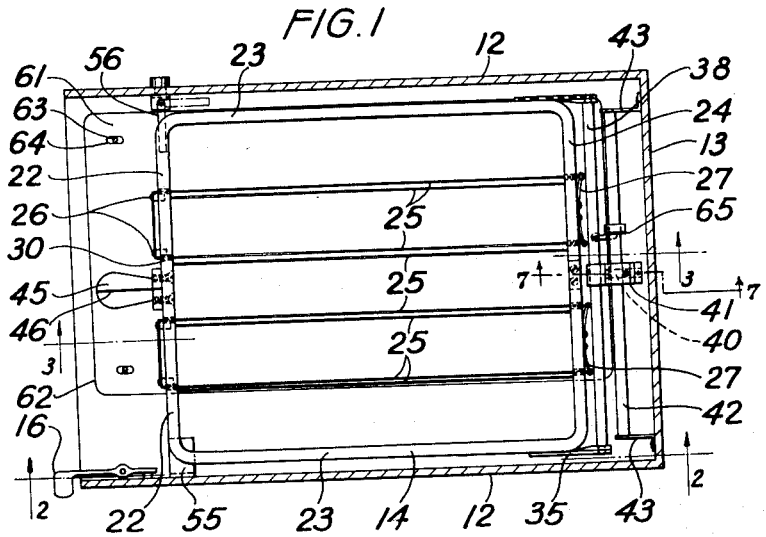
Fig. 1 is a horizontal sectional view taken substantially on the line 1—1 of Fig. 2, showing a document holding device and the support therefor constructed in accordance with the preferred embodiments of the invention.

The wires or filaments 25 on each frame member are arranged in pairs, as clearly shown in Fig. 1. The pairs of wires on the frame 20, however, extend across the top thereof while the pairs on the frame 21 extend across the bottom thereof, so that all the wires 25 will be substantially in a plane. The wires of each pair are formed from a single strand which is looped under spaced pins 26 extending outwardly from the front 22 of the frame member. The pairs of wires then extend across the frame member in spaced relation and substantially parallel to the sides 23, as shown in Fig. 1. The ends of each strand are fastened to the free ends of a U-shaped leaf spring 27, which tightly draw or tension the strands or filaments 25, as will be apparent from an inspection of Fig. 1. The leaf springs 27 are secured to the back 24 of the frame members in any suitable well-known manner. The wires 25 of the two frame members 20 and 21 are preferably staggered horizontally, as shown in Fig. 1, so as to provide a document supporting means for substantially the full distance between the sides 23. For the purpose of clearness, however, the leaf springs 27 on the lower frame member 21 have been omitted. The wires 25 on the frame members 20 and 21 are also preferably slightly spaced vertically a distance substantially equal to the thickness of the checks or documents to be photographed. To this end, the wires 25 are recessed in small slots or notches 30 formed in the engaging surfaces of the fronts 22 and the backs 24 of the two frame members, as shown in Fig. 1.

The members 20 and 21 are normally in closed position, as shown in Fig. 2. When, however, checks or other documents are to be placed between the wires 25, the members are separated or moved relative to each other. In order to thus move or separate the frame members, the latter are hingedly connected along one side thereof much in the manner of the well-known "steak roaster". This hinged construction is provided, in the present embodiment, by cooperating hinge members 35 which are secured to the opposite sides 23 of both the frame members by means of screws 36 or other suitable fastening means. These hinge members are provided with registered apertures 37 through which a hinged pintle 38 extends to connect the members 35 and to hingedly connect the frame members 20 and 21 along the back 24, as shown in Fig. 1.

The pintle 38 has secured thereto a rearwardly projecting trunnion 40 which is rotatably mounted in a bearing 41 depending from a split block 44 through which the shaft 42 is passed. The two portions of the block 44 are drawn together by means of a screw 51 to tightly clamp the block to the shaft 42, in a manner well known to those in the art. The opposite ends of the shaft 42 are movably mounted in brackets 43 carried by the back 13. The trunnion 40 is held in position in the bearing 41 by means of a collar 52 which is pinned or otherwise secured to the free end of the trunnion, all as shown in Fig. 7. The front 22 of each of the frame members is provided with a portion of a handle or gripping member 45. This handle is preferably split, as shown in 46, Fig. 1, so that approximately half of the handle is carried by each of the frame members 20 and 21. By means of this arrangement, the frame members may be separated, regardless of which one is uppermost. However, when the frame members are in closed position, the two handle parts register to provide a unitary handle construction by which both frames may be turned or flipped over, as will be presently described. The frame members may be releasably held in closed position in any suitable manner, such for example as by means of the arrangement shown in Figs. 5 and 6, in which a projecting pin or lug 47 and one of the frame members, in this case 20, is held between slightly spaced arms of a U-shaped spring 48 positioned in a recess 49 formed in the upper face of front 22 of the opposite frame member, such as 21. The spring 48 is held in position in the recess 49 by means of a screw 50, which passes through the curved portion of the spring 48 and into a registering threaded opening in the frame member, as shown in Fig. 6.

In photographic checks, it is often desirable, particularly in the case of large checks, to not only photograph the front of the check but to also photograph the back thereof, so as to secure a record of the various endorsements. After the checks have been positioned between the wires 25, one side of the check is photographed on miniature film by means of a camera positioned within the enclosure 15. After one side of the checks have been thus photographed, the handle 45 is grasped and the frame members are flipped over in a manner similar to the turning of the well known "steak roaster". In this flipping or turning operation, the trunnion 40 rotates in the bearing 41. The opposite side of the documents may now be photographed. In order to permit the device 14 to be thus turned or flipped over, it is preferably spaced a sufficient distance above the bottom 11 so that it will clear the latter during the turning operation, as is evident from an inspection of Fig. 2.

During the photographing operation, the check holding device is maintained substantially parallel to the bottom 11 by means of supports or brackets 55 and 56, which project inwardly from the sides 12 and engage the device adjacent the front thereof, as clearly shown in Fig. 1. These brackets 55 and 56 cooperate with the trunnion 40 and its bearing 41 to provide a spaced three point support for the check holding device so as to maintain the latter in a plane, as is well known. The bracket 56 is preferably foldable or collapsible, as shown in dotted lines, Fig. 1, for a purpose to be later pointed out. When not in use, the document holding device 14 may be swung to an inoperative position adjacent the back 13, as shown in Fig. 3. In this position, the handle 45 is releasably held by means of a spring clip 60, of the shape best shown in Fig. 4. It is apparent from an inspection of Figs. 1 and 2 that, when the device 14 is swung to its inoperative position, it will pivot in the brackets 43 about the axis of the shaft 42, which is normal to the axis about which the device rotates when flipped over, as above described. The device 14 is thus so mounted that it may be turned about two different axes which are arranged normal to each other.

Referring now to Fig. 3, it is obvious that when the device 14 is moved to its inoperative position, the interior of the supporting housing is free from obstructions and is, therefore, admirably adapted for use as a projecting apparatus. A projector, of any suitable well-known type, may be positioned in the enclosure 15 alongside of the photographic camera. This projector is arranged to project enlarged images downwardly onto a suitable viewing screen, so that the latter may be viewed through the front of the housing, as will be apparent. The bottom 11 may be used as a viewing surface, but it is preferred to provide an additional member in the form of a thin metal plate 61, the upper face of which is suitably painted or coated to provide a suitable viewing surface. When the device 14 is in an operative position, as shown in Fig. 2, the plate or viewing screen 61 lies substantially flat against the bottom 11.

When, however, the device 14 is moved to its inoperative position, as shown in Fig. 3, the screen 61 is tilted slightly. This tilting of the screen facilitates the viewing of the image projected thereon, as is well known to those in the art. In the present embodiment of the invention, the viewing screen 61 is automatically moved to its tilted position when the document holding device 14 is moved to an inoperative position. To secure this result, the front edge 62 of the screen is pivoted to the bottom 11. This pivoting connection is provided by means of pins 63 which extend upwardly from the bottom 11 and through registering opening 64 in the plate 61. These openings are slightly larger than the pins 63, as shown in Fig. 1, so that the plate may tip slightly thereon.

The shaft 42 has rigidly mounted thereon a laterally extending arm 65 to the free end of which a depending L-shaped link 66 is secured. The lower end of this link is provided with a small lug or protuberance 67 which is arranged to extend through an aperture, not shown, in the plate 61 adjacent the rear edge 69 thereof, as shown in Figs. 1, 2 and 3. When the parts are in the position shown in Fig. 2, the arm 65 extends downwardly so that the viewing screen or plate 61 lies substantially on the bottom 11. When, however, the document holding device 14 is moved to the position shown in Fig. 3, the shaft 42 is rotated in a clockwise direction, as viewed in Fig. 3. This rotation of the shaft 42 also rotates the arm 65 to the position shown in Fig. 3, thus lifting the link 66 and the right end 69 of the plate 61. By means of this arrangement, the moving of the document holding device to its inoperative position automatically moves the plate 61 to its inclined or operative position. As the projector is offset laterally relative to the camera, the screen 61 is also necessarily offset, as shown in Fig. 1. For this reason, the bracket 56 is collapsible or foldable, so that it may be moved or folded against the side 12 when the viewing screen is to be used.

The operation of the apparatus may be briefly described as follows: The document holding device 14 is normally in the position shown in Fig. 2. A portion of the split handle 45 may be grasped to raise the upper frame member 20 or 21 to separate these members, the upper member pivoting about the hinged pintle 38. The checks or documents to be photographed are then placed in position on the wires 25 of the lower frame member. The upper frame member is then lowered to the position shown in Fig. 2 to bring the wires 25 thereon into engagement with the upper faces of the checks, so that the latter will be held between the upper and lower set of wires. The upper side of the checks are then photographed on miniature film carried by the camera, housed in the enclosure 15. After one side of the checks has been thus photographed, the handle 45 is grasped and the check holding device 14 is flipped or turned over to expose the back of the check, the trunnion 40 turning in the bearing 41. After both sides of the checks have been thus photographed, the frame members are then separated and the checks removed and replaced by a new group which are to be photographed. The above operation is then repeated, until all the desired checks have been photographed on both sides.

When the apparatus is to be used as a projecting or viewing device, the handle 45 is grasped to swing the two frame members 20 and 21, about the axis of the shaft 42, to the inoperative position shown in Fig. 3. This movement rotates shaft 42 and the arm 65, so as to lift the screen 61 to its tilted or inclined position, as shown in Fig. 3. The apparatus may now be used as a viewing device.

It is thus apparent, from the above description, that the present invention provides an apparatus which may be selectively used as either a photographic or a viewing device. It is also apparent that the present invention provides a new and improved device for holding small documents so that the latter may be photographed on miniature film.

While one embodiment of the invention has been disclosed, it is to be understood that the inventive idea may be carried out in a number of ways. This application, therefore, is not to be limited to the precise details described, but is intended to cover all variations and modifications thereof falling within the spirit of the invention or the scope of the appended claims.

What I claim is:

1. A device for holding documents to be photographically recorded comprising, in combination, a pair of frame members, a hinge for connecting said members at one side thereof, means secured to said hinge for pivotally mounting said device so that the latter may be turned over to expose the opposite side of the documents held in said device, a support for said means, a plurality of spaced filaments carried by each of said frame members and arranged to support said documents and to hold the latter substantially in a plane, and means for tensioning said filaments.

2. A device for holding documents to be photographically recorded comprising, in combination, a pair of frame members, hinge members on each of said frame members, a pintle connecting said hinge members to hingedly join said frame members at one side thereof, a trunnion mounted on said pintle for pivotally supporting said device so that the latter may be turned over to expose the opposite side of the documents held in said device, a plurality of document supporting filaments carried by each of said members, means carried by said frame members for tensioning said filaments, and a support for said trunnion.

3. A device for holding documents to be photographically recorded comprising, in combination, a pair of frame members, a hinge for connecting said members at one edge thereof, means for movably mounting said frame members so that the latter may be turned over to expose the opposite side of the documents held therein, means on which said first-mentioned means is movably mounted whereby said frame members may be moved to an inoperative position, a viewing screen, and means connected to and controlled by said frame members for moving said screen to operative position when said frame members are moved to an inoperative position.

4. A device for holding documents to be photographically recorded comprising, in combination, a pair of frame members, a hinge for connecting said members at one edge thereof, a trunnion operatively connected to said frame members, a bearing in which said trunnion is mounted so that said frame members may be turned over to expose the opposite side of the documents supported thereby, means for movably supporting said bearing so that the latter may be swung about an axis normal to axis of said trunnion so that said frame members may be moved to an inoperative position, a viewing screen, means for operatively connecting said screen to said last mentioned means so that said screen will be automatically moved to an operative position when said frame members are moved to said inoperative position.

5. A device for holding documents to be photographically recorded comprising, in combination, a pair of frame members, a hinge for connecting said members at one edge thereof, a trunnion carried by said hinge, a bearing in which said trunnion is mounted so that said frame members may be turned over to expose the opposite side of the documents positioned thereon, a shaft extending through and movable as a unit with said bearing, means for supporting said shaft, said bearing and shaft being movable relative to said means to permit said frame members to be moved to an inoperative position, a viewing screen, an arm carried by said shaft, and a link connecting said screen and said arm so that when said frame members are moved to said inoperative position, said screen is automatically moved to an operative position.

6. In a device for photographically recording documents, the combination with a housing, of a device positioned within said housing and adapted to support documents to be recorded, said device comprising a pair of frame members, a hinge connecting said frame members along one side thereof, a plurality of filaments carried by said frame members and arranged to support said documents so that the latter may be recorded, means mounted on said housing for supporting said hinge, said last mentioned means being movable relative to said housing to permit said frame members to be moved to an inoperative position, a viewing screen having one end thereof hingedly connected to said housing, and means connecting the other end of said screen to said last mentioned means so that when said frame members are moved to an inoperative position said viewing screen will be moved to an operative position.

7. In a device for photographically recording documents, the combination with a housing, of a device positioned within said housing and adapted to support documents to be recorded, said device comprising a pair of frame members, a hinge connecting said frame members along one side thereof, a plurality of filaments carried by said frame members and arranged to support said documents so that the latter may be recorded, leaf springs carried by said frame members for tensioning said filaments, a pair of brackets mounted on said housing, a shaft movably supported in said brackets, a bearing secured to and movable with said shaft, a trunnion carried by said hinge and movable supported in said bearing so that said frame members may be turned over to expose the opposite sides of the documents positioned in said frame members, said shaft being movable relative to said brackets to permit said frame members to be moved to an inoperative position, a viewing screen hingedly secured at one end thereof to said housing below said frame members, a laterally projecting arm on said shaft, and a link connecting said arm to the other end of said screen to elevate the latter when said frame members are moved to said inoperative position.

8. In a device for photographically recording documents, the combination with a housing having sides, a bottom and a top, of a device positioned within said housing and adapted to hold documents in position to be recorded, said device comprising a pair of frame members, a plurality of wires extending across each of said frame members to support the documents thereon, leaf springs secured to said frame members and engaging the ends of said wires to tension the latter, hinge members on each of said frame members adjacent one edge thereof, a pintle connecting said hinge members, a trunnion mounted on and projecting rearwardly from said pintle, a bearing in which said trunnion is mounted so that said frame members may be turned over to expose the opposite sides of the documents, a shaft on which said bearing is rigidly secured, said shaft having the axis thereof normal to the axis of said trunnion, brackets for movably mounting said shaft on one of said sides, means on others of said sides and cooperating with said trunnion to support said frame members above said bottom, said shaft being movable in said brackets to swing said frame members to an inoperative position adjacent said one side, means on said one side for releasably securing said frame members in said inoperative position, a laterally projecting arm secured to and movable with said shaft, a viewing screen having an edge thereof hingedly secured to said bottom, and a link connecting the opposite end of said screen to said arm so that when said frame members are moved to said inoperative position, said opposite end will be elevated relative to said bottom.

ROY S. HOPKINS.